US008878845B2

(12) United States Patent
Brown

(10) Patent No.: US 8,878,845 B2
(45) Date of Patent: Nov. 4, 2014

(54) EXPANDABLE GRAPHICAL AFFORDANCES

(75) Inventor: Hans-Frederick Brown, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 156 days.

(21) Appl. No.: 13/270,087

(22) Filed: Oct. 10, 2011

(65) Prior Publication Data
US 2012/0086719 A1 Apr. 12, 2012

Related U.S. Application Data

(60) Provisional application No. 61/392,383, filed on Oct. 12, 2010.

(51) Int. Cl.
G06T 15/04 (2011.01)
A63F 13/10 (2006.01)
G06T 19/20 (2011.01)
G06T 17/30 (2006.01)

(52) U.S. Cl.
CPC ............... *G06T 17/30* (2013.01); *G06T 19/20* (2013.01); *G06T 2219/2021* (2013.01)
USPC ............ 345/420; 345/650; 345/661; 345/676

(58) Field of Classification Search
CPC ..... G06T 15/04; G06T 11/001; G06T 15/005; G06T 3/0018
See application file for complete search history.

(56) References Cited

U.S. PATENT DOCUMENTS 6,204,860 B1 * 3/2001 Singh ........................... 345/420
6,384,849 B1 * 5/2002 Morcos et al. ................ 715/810
6,628,279 B1 * 9/2003 Schell et al. .................. 345/420
6,639,592 B1 * 10/2003 Dayanand et al. ............ 345/419
6,985,793 B2 1/2006 Landers et al.
7,196,702 B1 3/2007 Lee et al.
7,571,079 B2 8/2009 Chin et al.
7,733,340 B1 6/2010 Desimone et al.
7,814,441 B2 * 10/2010 Bae et al. ...................... 345/420
8,305,376 B2 11/2012 Ran et al.
2011/0025688 A1 2/2011 Schneider et al.

OTHER PUBLICATIONS

Surface Modeling, Chapter 15, solidworks—2003.*
Instant Maya for Windows, Irix and Linux, 2002, Alias|Wavefront, a division of Silicon Graphics Limited.*
"Associative feature modeling for concurrent engineering integration", School of Mechanical and Production Engineering, Nanyang echnological university, 50 Nanyang Avenue, Singapore 639798, Singapore, Received Nov. 22, 2001; accepted Feb. 1, 2003', Ma et al.*
Lombard, M., "SolidWorks 2010 Bible", Chapters 1, 3, 4, 6, 7, 10, 27, 30, Published Apr. 12, 2010. ISBN 978-0-470-55481-4.
Tornincasa, S., et al., "The Future and the Evolution of CAD", 14th International Research/Expert Conference, Trends in the Development of Machinery and Associated Technology, TMT 2010, Mediterranean Cruise, pp. II-1 to II-18, Sep. 11-18, 2010.

* cited by examiner

Primary Examiner — Ulka Chauhan
Assistant Examiner — Saptarshi Mazumder
(74) Attorney, Agent, or Firm — Gates & Cooper LLP

(57) ABSTRACT

A method, apparatus, system, article of manufacture, and computer readable storage medium provide the ability to create and edit a surface object in a computer implemented surface modeler. A surface object creation process is commenced and a surface object type is selected. During the surface object creation process, visual affordances are presented. The visual affordances are grips that can be used to inject modification into the surface object creation process. Subsequent to creation of the surface object, the same visual affordances are displayed and used to edit the surface object.

18 Claims, 16 Drawing Sheets

EXPANDABLE GRAPHICAL AFFORDANCES

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/392,383, filed on Oct. 12, 2010, by Jiri Kripac, Hans-Frederick Brown, and Pei Zhan, entitled "FRICTION-LESS SURFACE MODELING ENVIRONMENT,".

This application is related to the following co-pending and commonly-assigned U.S. patent application(s), which is/are incorporated by reference herein:

Utility patent application Ser. No. 13/270,078, filed on Oct. 10, 2011, by Jiri Kripac, Hans-Frederick Brown, and Pei Zhan, entitled "PASSIVE ASSOCIATIVITY IN THREE-DIMENSIONAL (3D) MODELING," which application claims priority to Provisional Application Ser. No. 61/392,383, filed on Oct. 12, 2010, by Jiri Kripac, Hans-Frederick Brown, and Pei Zhan, entitled "FRICTION-LESS SURFACE MODELING ENVIRONMENT,".

BACKGROUND OF THE INVENTION

1. Field of the Invention

The present invention relates generally to computer graphics, and in particular, to a method, apparatus, and article of manufacture for three-dimensional (3D) surface modeling applications and an expendable graphic affordance system for editing surfaces.

2. Description of the Related Art

In computer-aided design (CAD) drawing applications, parametric/associative surface models consists of a (possibly large) collection of individual surface objects. The surface objects may depend on each other or depend on other objects or parameters. A common way a surface may become dependent on other objects is when it is created using geometry of the other objects (referred to herein as related surfaces/geometry/objects). An example is a blend surface that is created by selecting two edges of two other surfaces, or an offset surface that is created by offsetting another surface.

In some scenarios, it is desirable for the surfaces to keep their relations and let the system automatically preserve these relations and update all related surfaces when some surfaces are edited. In other scenarios, it is more desirable not to maintain these relations and treat the surfaces as individual unrelated surfaces to avoid unintended change propagations. However, even if the relations between the surfaces are not maintained, it is desirable to be able to edit as many parameters of the surface as possible. For example it is desirable to be able to edit the blend surface continuity (G0-positional, G1-tangential, G2-curvature) or the offset surface distance, even if from the user's point of view the edited surface does not maintain any relation with the surfaces from which it has been created. Such problems may be better understood with a description of solid modeling and the management of relations in such models.

Most traditional solid modelers are based on feature driven modeling operations where two-dimensional (2D) sketches are extruded/revolved/lofted and each subsequent feature is built on the previous feature. These modeling operations are usually displayed to the user in a tree structure (feature history tree) and edit operations must follow the hierarchical order of the tree. In addition, most of the parametric data is entered via dialogs during the creation process and subsequent modifications are summoned from the feature tree.

Simpler solid modelers work directly on the B-REP (boundary representation) and modeling operations are not tracked or maintained in a parametric/history tree. These type of modelers usually let the user tweak vertices/edges/faces of a solid without any sort of constraints. This modeling paradigm is useful when working with imported models or complex native models. Further, such simple modelers usually let the user modify a vertex/edge/face via either dialog or move/rotate/scale graphic affordances directly in the canvas.

More recently a new "synchronous" technology was introduced that permits one to blend the advantage of the traditional features like solid modeling with some of the direct modeling advantages. The users are also presented with a "Feature Tree" browser but the features are auto-detected by analyzing the model itself—thus providing greater flexibility and not relying on a linear succession of modeling operations. Further, in most cases, the user is presented with graphic affordances directly in the canvas that relates to the parametric property being edited or detected.

On the other hand, most surface modelers are either pure NURBS (non-uniform rational b-spline) modelers where all operations result in a NURBS surface, or are solid modeling disguised as surface modelers. In the latter case, surfaces are considered "bodies" and any of the previous modeling paradigms are used on them (e.g., feature driven, direct, synchronous, etc.).

Some of the pure NURBS modelers have implemented their own associative engines that track underlying creation geometry (e.g., 2D/3D sketches) and some of the edit operations (e.g., trimming/blending surfaces). The associative actions are sometimes displayed in a scene graph (i.e., similar to a history tree) and nodes have a limited editing capability. Further, most of the surface edits are made directly on the surface using various widgets/gizmos (e.g., move/scale/rotate) that control the location of control vertices on the UV hull/texture map.

In summary, with prior art 3D surface modeling, surface objects can either be related or not related to each other. If related, a surface object is associative and depends on properties of "other surfaces." If the "other surfaces" change, the dependent surface automatically updates. Similarly, non-associative surfaces have no relation to surfaces that the non-associative surface from which it was created. However, because such a surface is non-associative, if the "other surface" is modified, the non-associative surface does not automatically update. Further, the non-associative surface does not maintain any history or knowledge base of the surfaces used to create it. Thus, the user has no option to retain an "associative/relation" knowledge base and limits the capabilities of the user to actively determine the behavior of a surface.

Further, prior art solid/surface creation/surface modeling paradigms are limited in their capability/functionality. In this regard, prior art modeling paradigms are mostly done through dialogs. Some modelers use industry standard gizmo/widget manipulators (e.g., move, scale, and rotate) to modify features, objects or components. Recent modelers have developed a set of manipulators for specific geometry properties and these are displayed when features or sub-components are selected. In addition, recent modelers expect that when a feature or sub-component is selected, the user is expected to modify the parametric properties, thus always displaying the graphic manipulators.

SUMMARY OF THE INVENTION

Embodiments of the invention introduce an expendable graphic for a friction-less surface modeling paradigm. The user is presented with visuals cues at creation time and in a second step, the system may display an expandable representation of the initial visual cue that can be triggered by the user to access the object property established at creation time.

Embodiments of the invention help reduce the current multiplication of visual affordance when object, feature or sub components are selected while providing a strategy for the positioning of such graphic affordances.

Further, the visual affordance may also be rationalized to a limited set of cues and thereby reduces the user cognitive load while learning the system. Such a system may provide fluid interaction and previewing where adjustment can be done directly on screen or via precise numerical values.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

As described above, prior art solid/surface creation/surface modeling paradigms may exhibit one or more of the following properties:

Are mostly created/modified through dialogs;

Some modelers use industry standard gizmo manipulators (e.g., move, scale, and rotate) to modify features, objects or components;

Recent modelers have developed a set of manipulators for specific geometry properties and these are displayed when features or sub-components are selected; and Recent modelers expect that when a feature or sub-component is selected, the user is expected to modify the parametric properties thus always displaying the graphic manipulators (i.e., a direct affordance activation strategy).

Embodiments of this invention provide a friction-less surface modeling paradigm where the user can benefit from the associative engine and its parametric data without being limited in his surface edits. In this regard, embodiments are "friction-less" because the ability to learn and utilize the new "passive-associative" state of a surface object is simple, does not create deleterious effects, and does not limit the user's ability to perform surface edits.

In addition to the above, an expendable graphic affordance system is provided for the friction-less surface modeling paradigm and presents users with visual cues for accessing and editing object properties.

Hardware Environment

Figure 1:
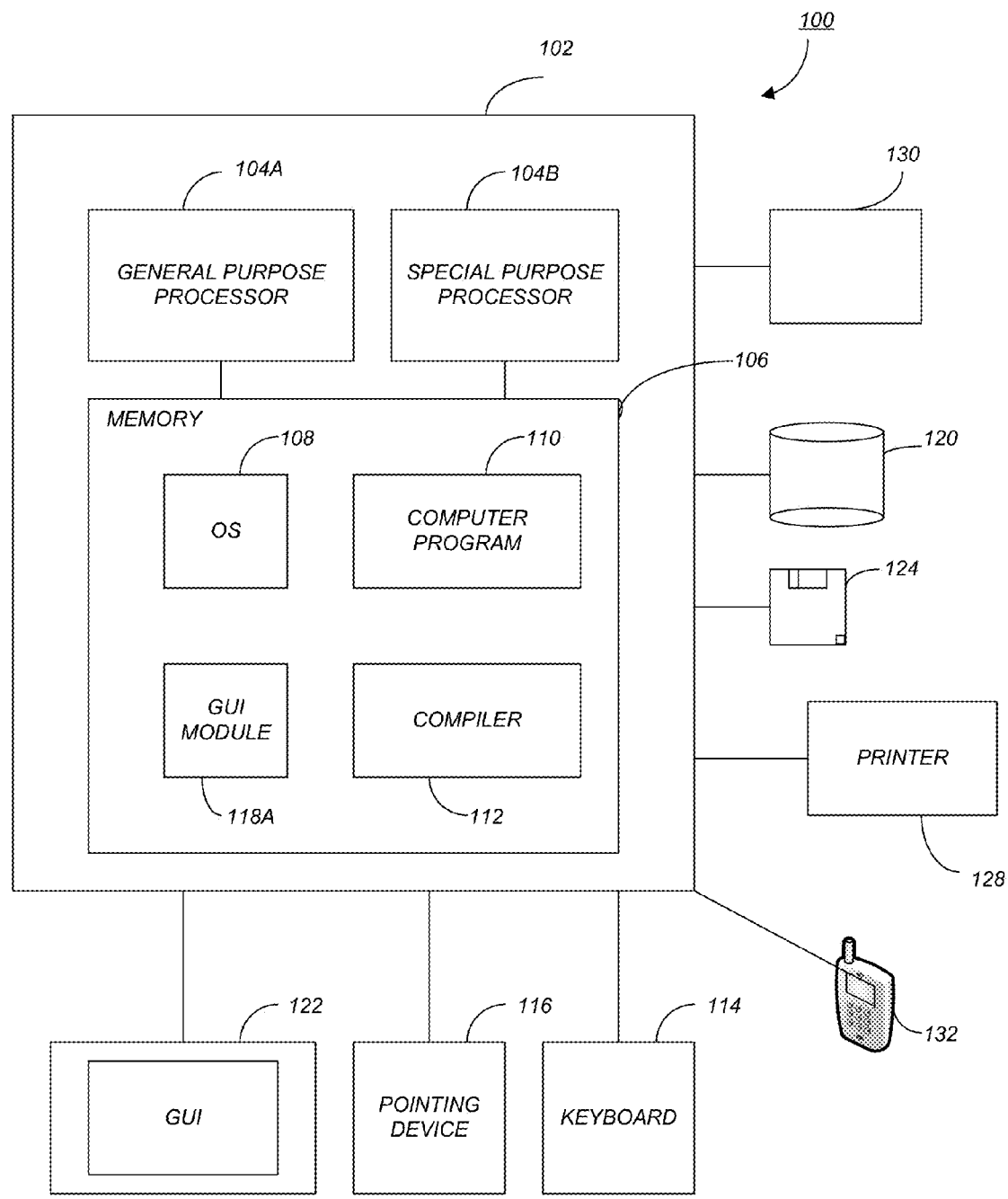
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to or integrated with other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to or may comprise a portable or media viewing/listening device 132 (e.g., an MP3 player, iPod™, Nook™, portable digital video player, cellular device, personal digital assistant, etc.).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of a multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Figure 2:
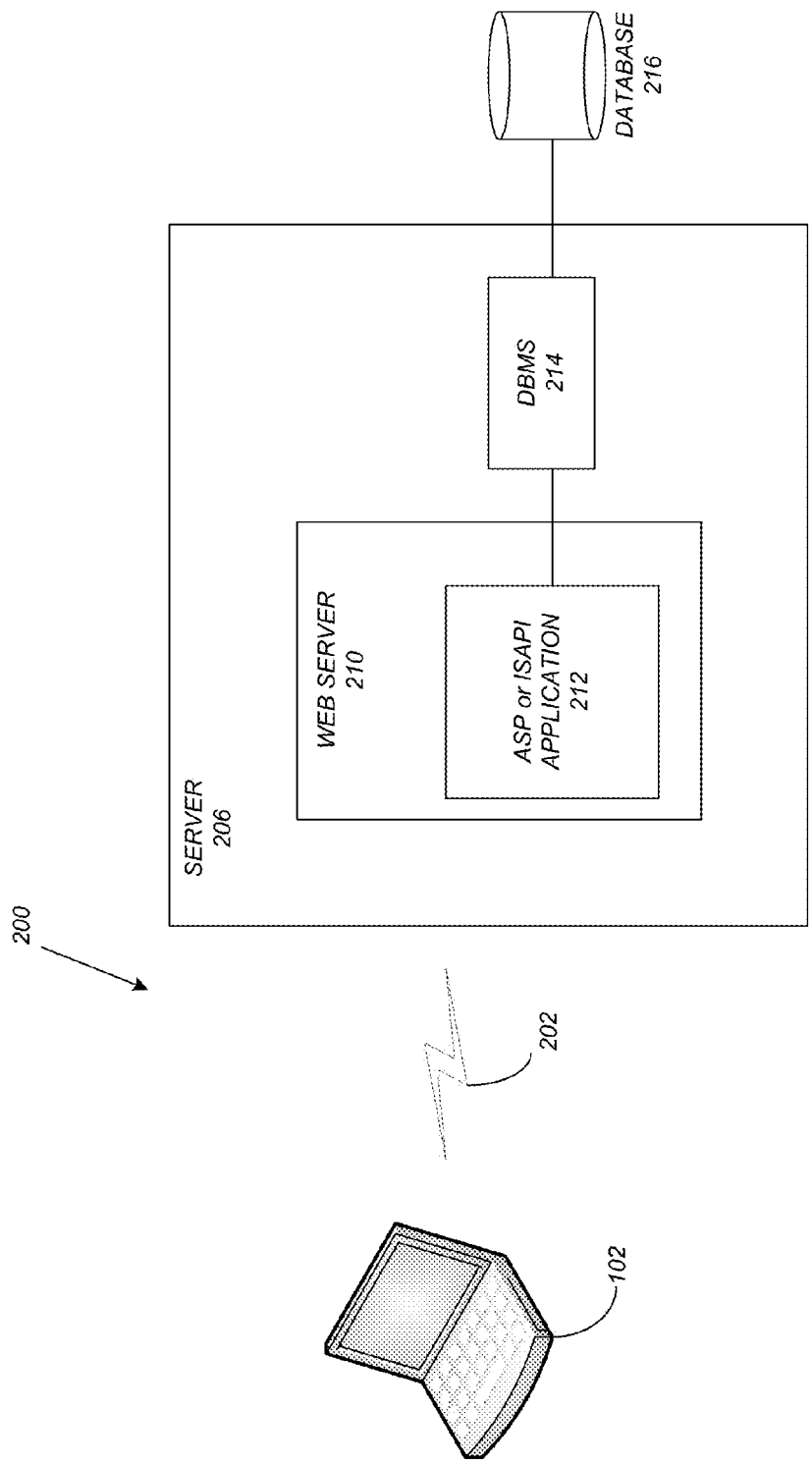
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1).

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102 may be downloaded from server computer 206 to client computers 102 and installed as a plug in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of or connected directly to client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 208-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 102 and 206 may include thin client devices with limited or full processing capabilities, portable devices such as cell phones, notebook computers, pocket computers, multi-touch devices, and/or any other device with suitable processing, communication, and input/output capability.

Of course, those skilled in the art will recognize that any combination of the above components, or any number of different components, peripherals, and other devices, may be used with computers 102 and 206.

Overview of Passive-Associative Functionality

Embodiments of the invention are implemented as a software application on a client 102 or server computer 206. Such a software application may comprise a computer-aided design (CAD) application (e.g., AutoCAD™ available from the assignee of the present application).

As described above and described in detail in the referenced co-pending patent application entitled "PASSIVE ASSOCIATIVITY IN THREE-DIMENSIONAL (3D) MODELING", which is incorporated by reference herein, embodiments of the invention utilize a passive associative feature for surface objects. With such functionality, even if a user elects to have a surface object be non-associative, an associative engine (i.e., within the software application) may maintain the relations internally and does not convert the object into a non-associative object unless necessary. Further, properties of the surface may be exposed based on such relations.

For example, a user may view and modify additional properties of a passive associative blend surface. Such additional properties may only be shown if the geometric conditions of the passive associative blend surface and the original input surface has not been changed. For example, if the passive associative blend surface still touches the original input surface, the additional properties may be displayed by the user. However, if either surface has been moved away (i.e., the passive-associative blend surface or one of the input surfaces on which it depends), the additional properties may be removed. Once the additional properties are removed, if an input surface is moved, the blend surface (dependent upon such an input surface) may not automatically update because it doesn't touch the input surface anymore. However, if all three surfaces are moved (i.e., the blend surface and the two input surfaces), the continuity/dependency between the passive associative blend surface and input surfaces has not been changed, and the additional properties may still be maintained.

Embodiments of the invention provide the ability for the user to state whether a surface is associative or passive associative. Thus, if the user labels a surface as associative, all updates will occur automatically without additional user input when an input surface is modified. However, with a passive associative surface, updates will not occur automatically but the additional properties may still be maintained. Prior art modeling applications do not provide the option to maintain/expose additional properties as with the passive associative capabilities of the present invention. Instead, prior art implementations are limited to associative and non-associative surfaces. Accordingly, there is no mechanism to request input from a user to determine if the user desires to break an association between two surfaces once/after the user has labeled a surface "non-associative" and later attempts to move such a non-associative or input surface.

Detailed Description of Expandable Graphic Affordances

Figure 3:
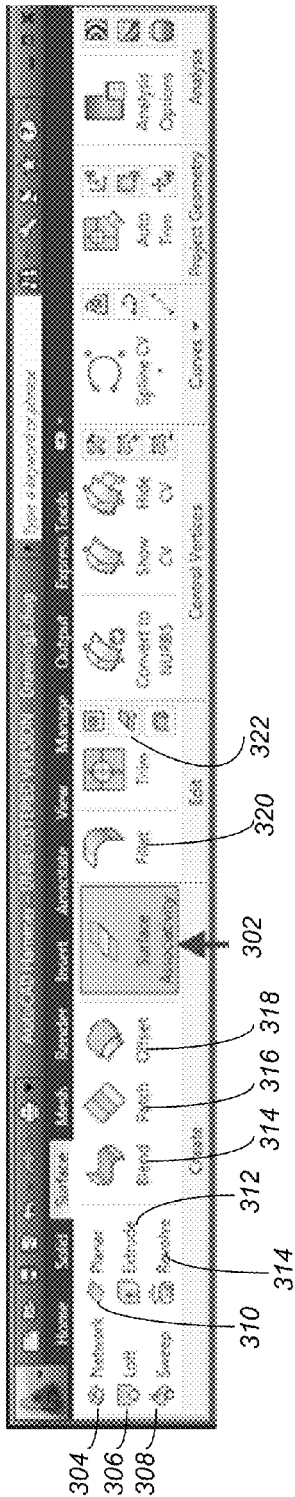
FIG. 3 illustrates a tool bar that may be used to create or edit a surface in accordance with one or more embodiments of the invention.

FIG. 3 illustrates a tool bar that may be used to create or edit a surface in accordance with one or more embodiments of the invention. The user can either create or edit surfaces with the "surface associativity" 302 on/off. Each creation action will generate a surface type and have specific visual affordances during the creation and its editing process. As illustrated in FIG. 3, the following are some exemplary surface types that may be created by selecting the appropriate icon:

Network Surface 304
Loft Surface 306
Sweep Surface 308
Planar Surface 310
Extrude Surface 312
Revolve Surface 314
Blend Surface 314
Patch Surface 316
Offset Surface 318
Fillet Surface 320
Extend Surface 322
Chamfer Surface Each of these surface objects will share the same visual affordance language when the associative engine 302 is "on" or "off".

A general expander visual cue will also be shared across the surfaces to limit the visual footprint during the creation an editing interactions. The positions of the visual cues follow a hierarchical system; with the prime positions reserved for high traffic user interaction.

The highest level of the hierarchy is selection specific and utilizes the center of the object's bounding box. A visual cue may be used to enable move/rotate/scale operations.

The next level in the hierarchy is object specific and utilizes the center of an object defining edge. Such a visual cue may be used to edit the continuity and bulge magnitude.

The bottom level of the hierarchy is also object specific and utilizes the upper corner of the object bounding to provide visual cues with object specific options.

In view of the above, embodiments of the invention enable a directed command flow that steps the user through the surface creation process. Such a directed flow provides the ability for the user to select the desired surface type followed by the manipulation (i.e., using the visual graphic affordances) of such a surface thereby resulting in the desired object surface. Thereafter, the same visual graphic affordances can be used to edit the surface.

Based on the above, specific examples of the creation and editing process follow: loft creation from 2D/3D profiles; loft editing interaction for lofts created from curves; loft creation using edges from existing surfaces; loft editing interaction for lofts created from surfaces; and in-canvas manipulators for each surface type.

Loft Creation from 2D/3D Profiles

Figure 4:
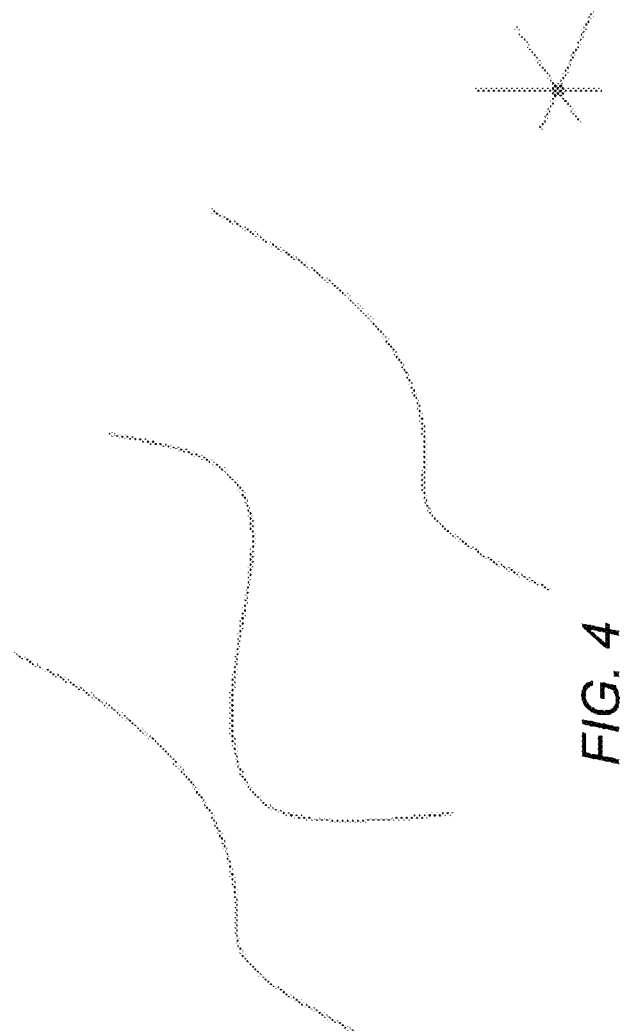
FIG. 4 illustrates three splines used to generate the lofted surface in accordance with one or more embodiments of the invention.

To better understand embodiments of the invention, a simple example of a loft created with three (3) spline profiles may be used. Associativity may be set either to "off" or "on". Accordingly, surface associativity has no impact on the visual cues and graphical language during the creation/editing process. FIG. 4 illustrates three splines used to generate the lofted surface in accordance with one or more embodiments of the invention.

Figure 5:
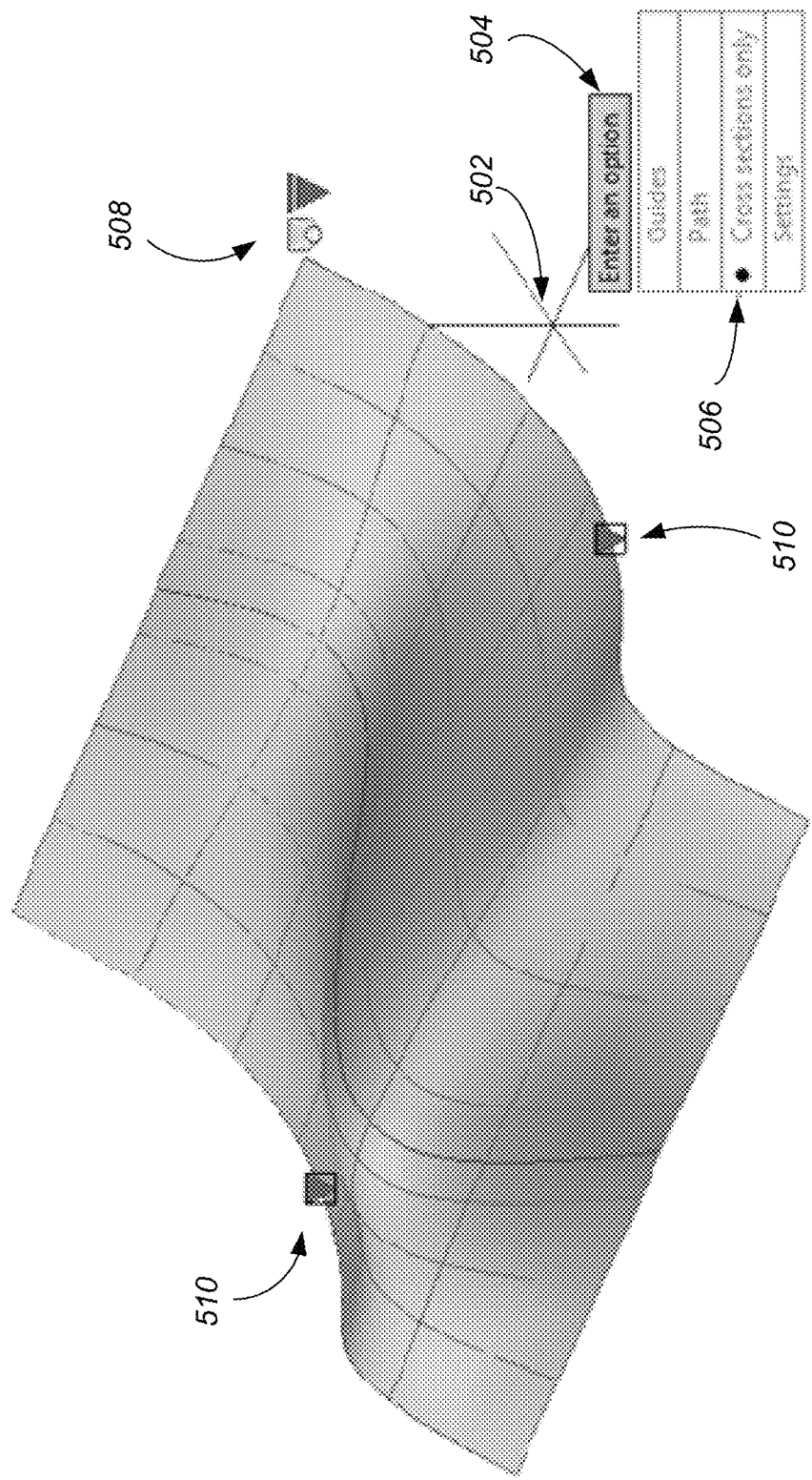
FIG. 5 illustrates the visual cues available during the creation process in accordance with one or more embodiments of the invention.

FIG. 5 illustrates the visual cues available during the creation process in accordance with one or more embodiments of the invention. During the creation process, multiple visual cues may be presented to the user. The crosshair 502 represents the mouse cursor and the directed command flow options 504 and 506 follow the crosshair 502. The user can either type the options (i.e., in box 504) or use the arrow key to navigate the options in box 506. Additional visual cues 508 and 510 are provided that will inject modification in the creation process without interfering with the directed command flow 504-506. A global loft option is available via grip 508 (see below for more info). Two expander grips 510 are also displayed to indicate that the edge condition can be modified. These expanders 510 are there to limit the visual clutter and hide/expose additional visual cues.

Figure 6:
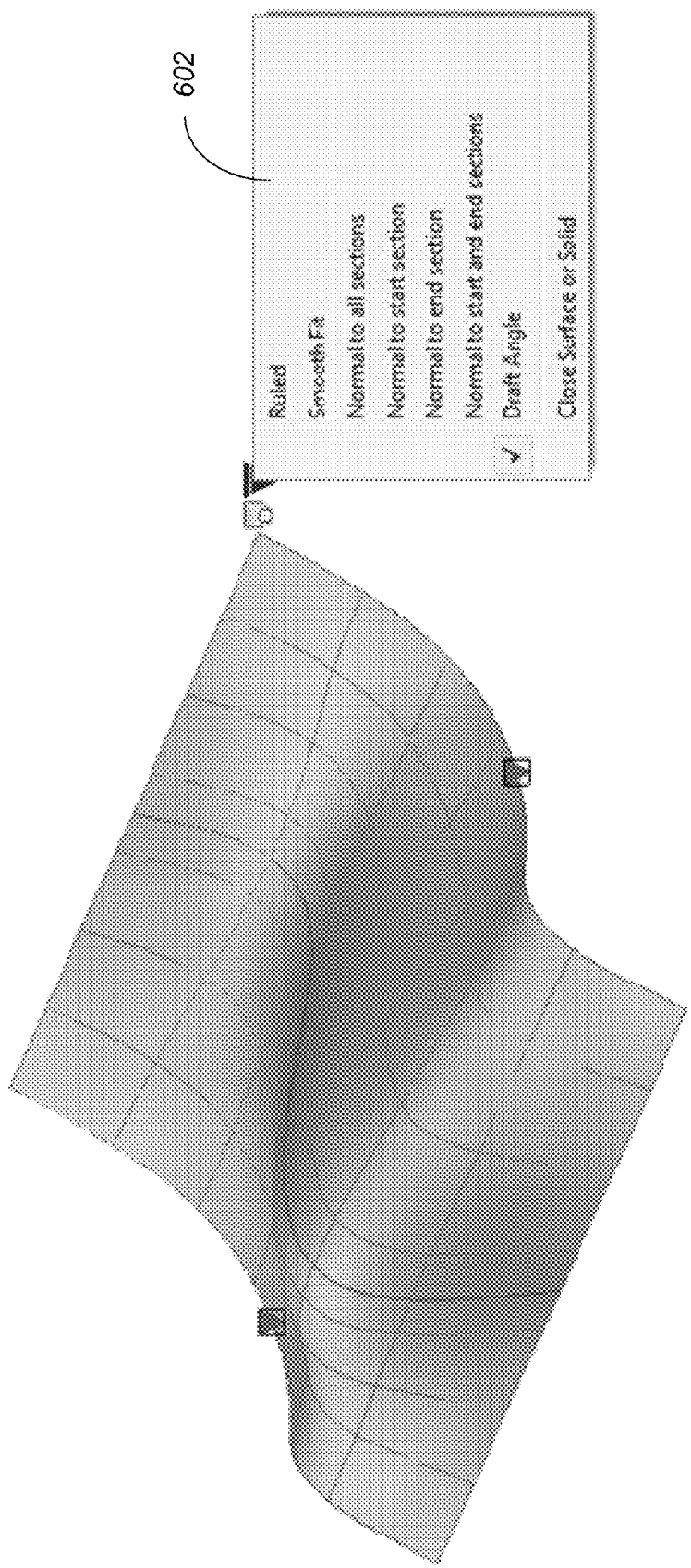
FIG. 6 illustrates the user expanding the loft option creation options 508 of FIG. 5 in accordance with one or more embodiments of the invention.

FIG. 6 illustrates the user expanding the loft option creation options 508 of FIG. 5 in accordance with one or more embodiments of the invention. As illustrated, in this particular case, the user is still in the command creation loop and clicks on the loft general options grips 508. This exposes a menu 602 in which the user can select what type of loft is being generated. The menu choices illustrated in FIG. 6 include ruled, smooth fit, normal to all sections, normal to start section, normal to end section, normal to start and end sections, draft angle, or close surface or solid. The list is not intended to be limiting and other options may be available. Once the user clicks any of the menu items thereby selecting a loft type, the system returns the user to the command creation loop.

Figure 7:
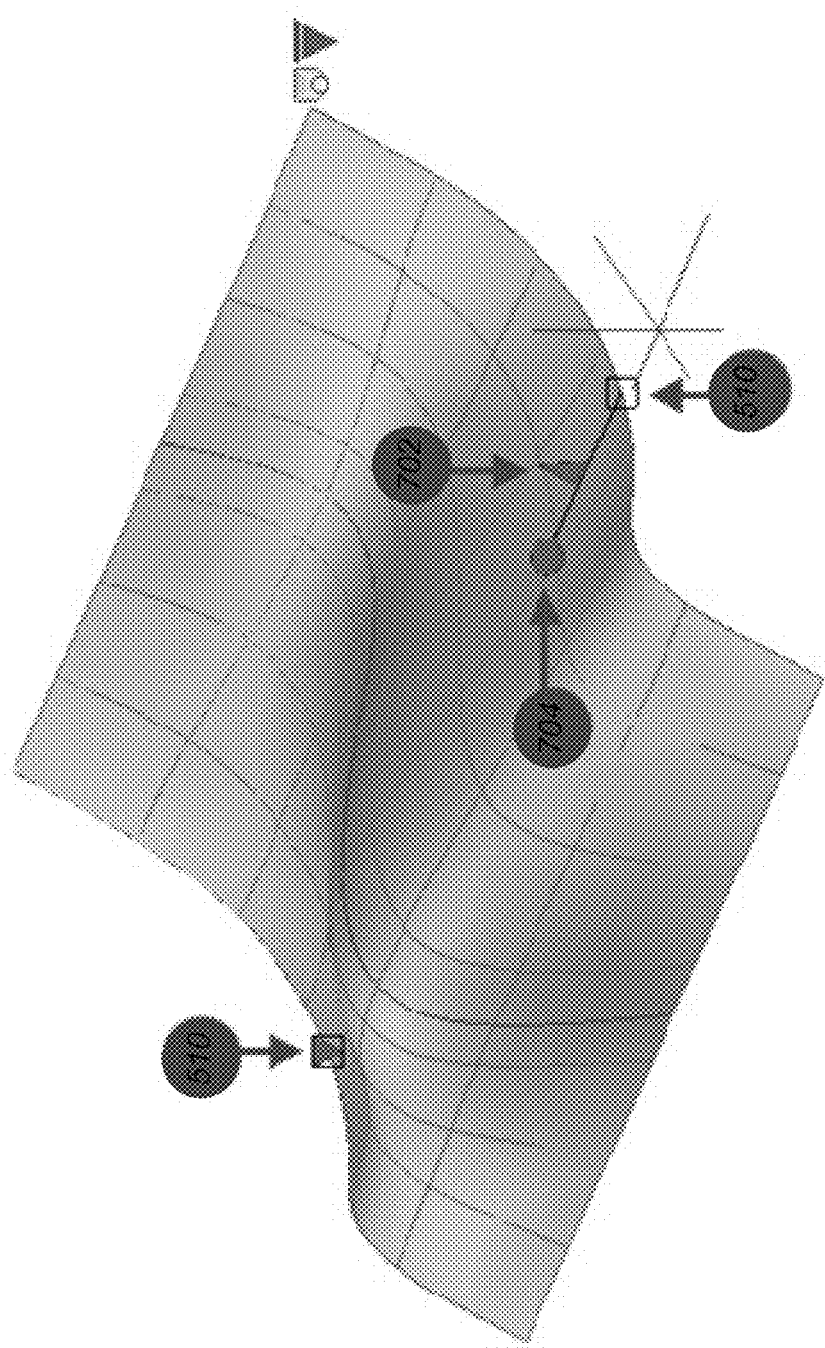
FIG. 7 illustrates the user activating the expander 510 resulting in the display of the draft angle and bulge magnitude visual affordances in accordance with one or more embodiments of the invention.

FIG. 7 illustrates the user activating the expander 510 resulting in the display of the draft angle and bulge magnitude visual affordances in accordance with one or more embodiments of the invention. In the case illustrated, the user is still in the command creation loop and clicks on the expander grip 510 on the right of the surface. In response to the clicking, the draft angle grip 702 and the bulge magnitude grip 704 are exposed/displayed.

Figure 8:
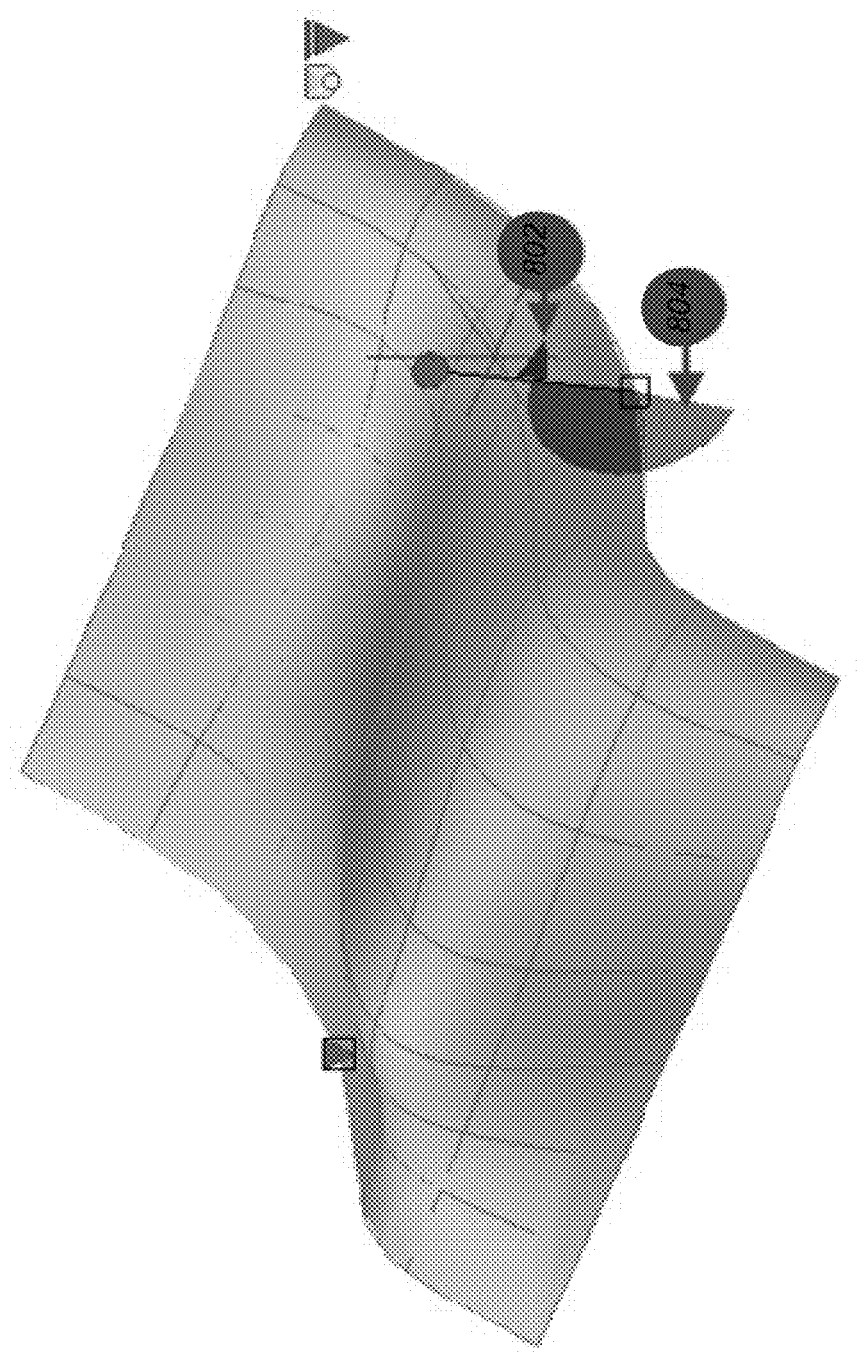
FIG. 8 illustrates the interaction with the draft angle grip 702 of FIG. 7 in accordance with one or more embodiments of the invention.

FIG. 8 illustrates the interaction with the draft angle grip 702 of FIG. 7 in accordance with one or more embodiments of the invention. To activate the graphical affordance displayed, the user clicks the draft angle grip 702 and while interacting with the graphical affordance, the surface is dynamically updated. Thus, while the user is still in the command creation loop, the user clicks on the draft angle grip 802 and starts moving it. The movement is constrained to a radial plane. The surface also updates based on the new angle value. The angle value is represented graphically via the visual cue 804. Once the user clicks to establish the angle, the system returns the user to the command creation loop.

Figure 9:
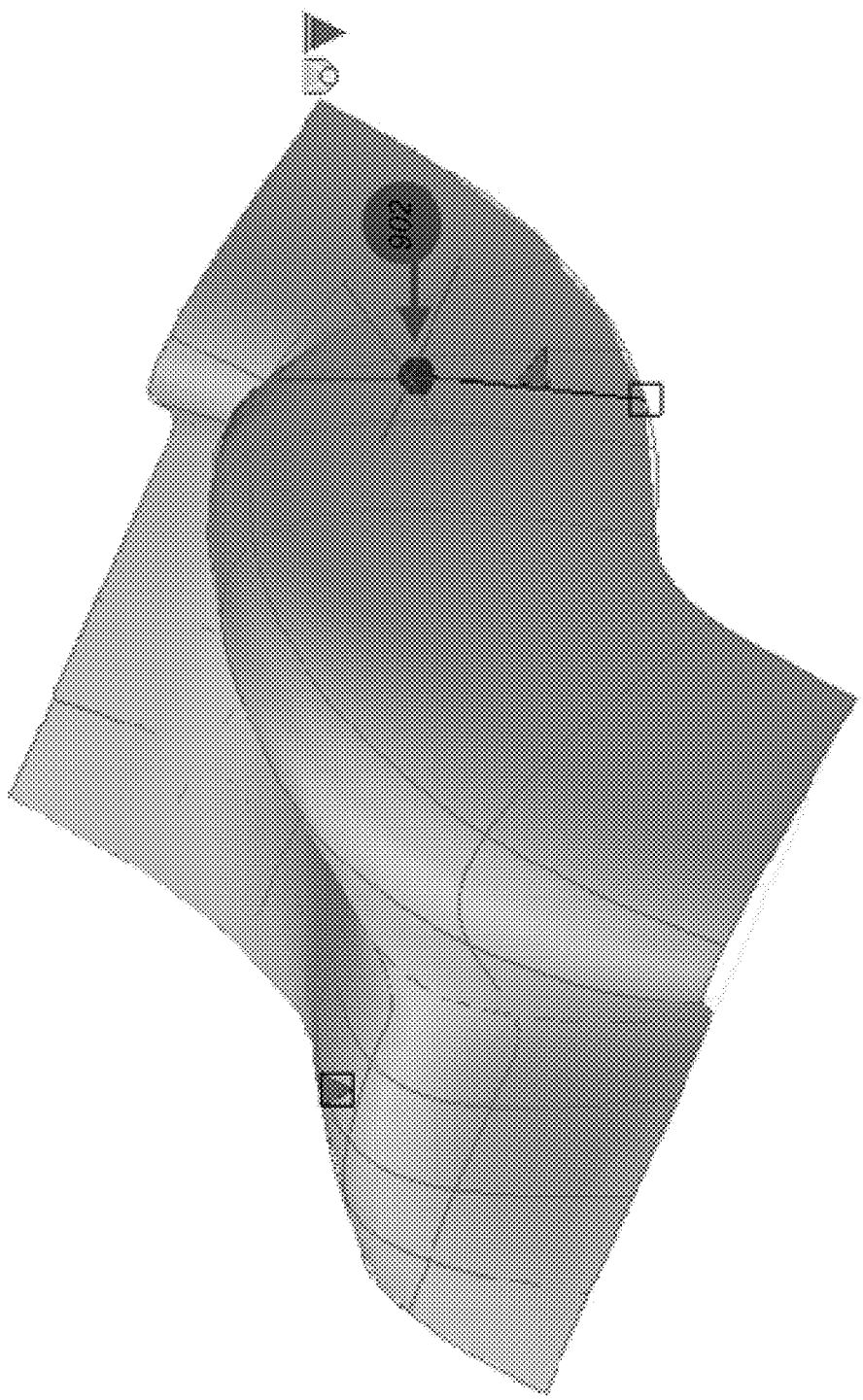
FIG. 9 illustrates the interaction with the bulge magnitude grip in accordance with one or more embodiments of the invention.

FIG. 9 illustrates the interaction with the bulge magnitude grip in accordance with one or more embodiments of the invention. In this case, the user is still in the command creation loop and clicks on the bulge magnitude grip 902 and starts moving it. The movement is constrained to a vector representing the direction of the bulge. The surface also updates (i.e., dynamically) based on the new magnitude value. Once the user clicks to establish the scale, the system returns the user to the command creation loop.

Loft Editing Interaction (Created from Curves)

Figure 10:
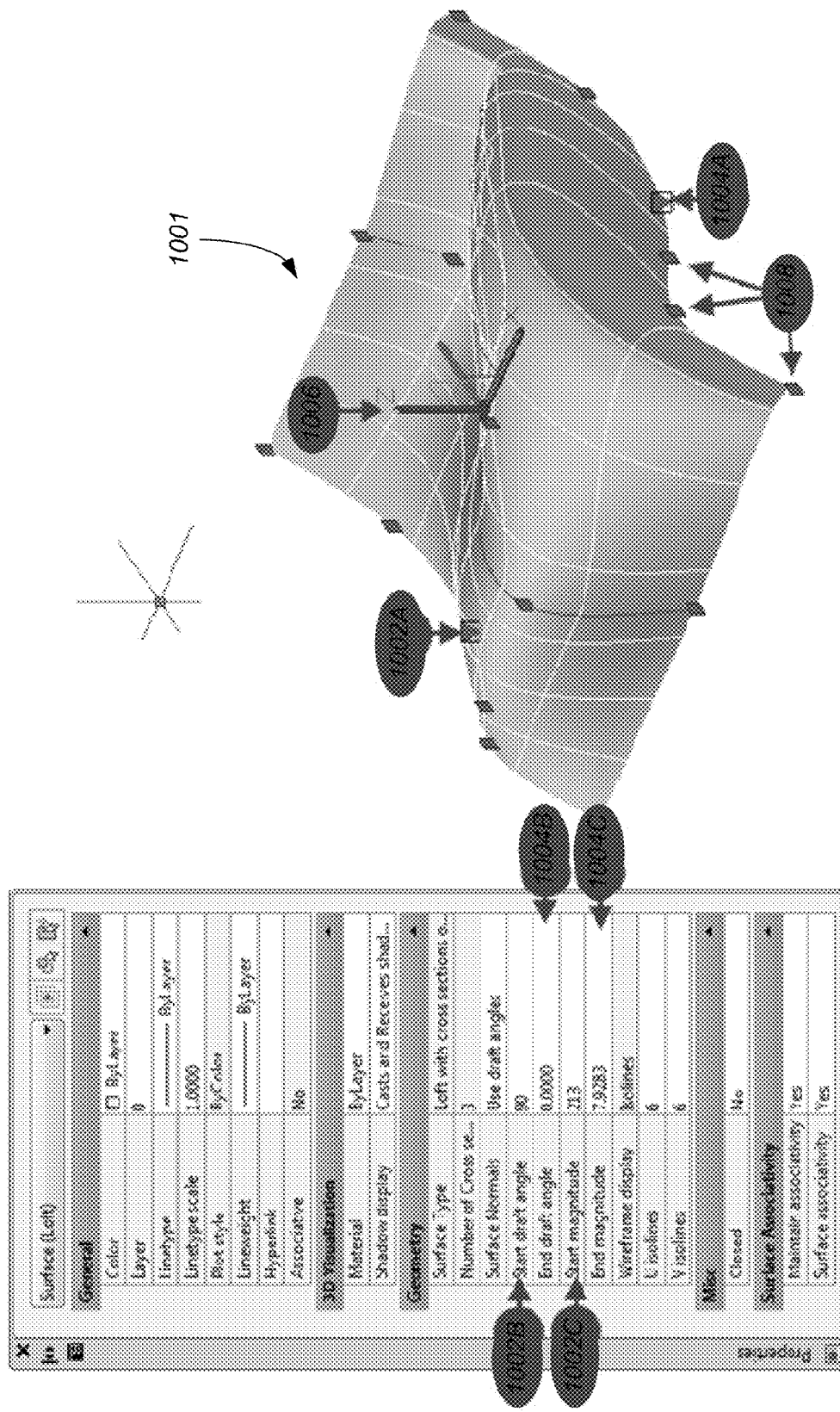
FIG. 10 illustrates an object property manager and corresponding selected lofted surface with graphical affordances for editing in accordance with one or more embodiments of the invention.

Once a loft surface has been created (as described above), the loft surface's properties may be edited. Users can edit the properties via an object property manager or directly on the surface using the expandable graphical affordances. FIG. 10 illustrates an object property manager and corresponding selected lofted surface with graphical affordances for editing in accordance with one or more embodiments of the invention.

Properties that are less utilized/modified have been hidden under the expander grips 1002A and 1004A to reduce the visual cluttering on the object itself. The "Start draft angle" 1002B and the "Start magnitude" 1002C from the object property manager 1000 are represented by the grip/expandable graphic affordance 1002A on the surface 1001.

The "End draft Angle" 1004B and the "End magnitude" 1004C from the object property manager 1000 are represented by the grip/expandable graphic affordance 1004A on the surface 1001.

The center 1006 of the surface 1001 is a prime location and is reserved for the high traffic interactions possible with the Move/Rotate/Scale Gizmo affordances.

The defining profiles grips 1008 (e.g., square grips shown in FIG. 10) are also available to modify the shape of the surface 1001. The user can simply hover on a profile grip 1008 and the current gizmo available on 1006 will relocate to their position. Once the gizmo is re-positioned, it affects the profile grip 1008 itself and not the global surface position/rotate/scale.

Accordingly, all visual cues have been re-used from the creation process, and the user can easily transfer knowledge of such visual cues/graphic affordances to the editing process.

Figure 11:
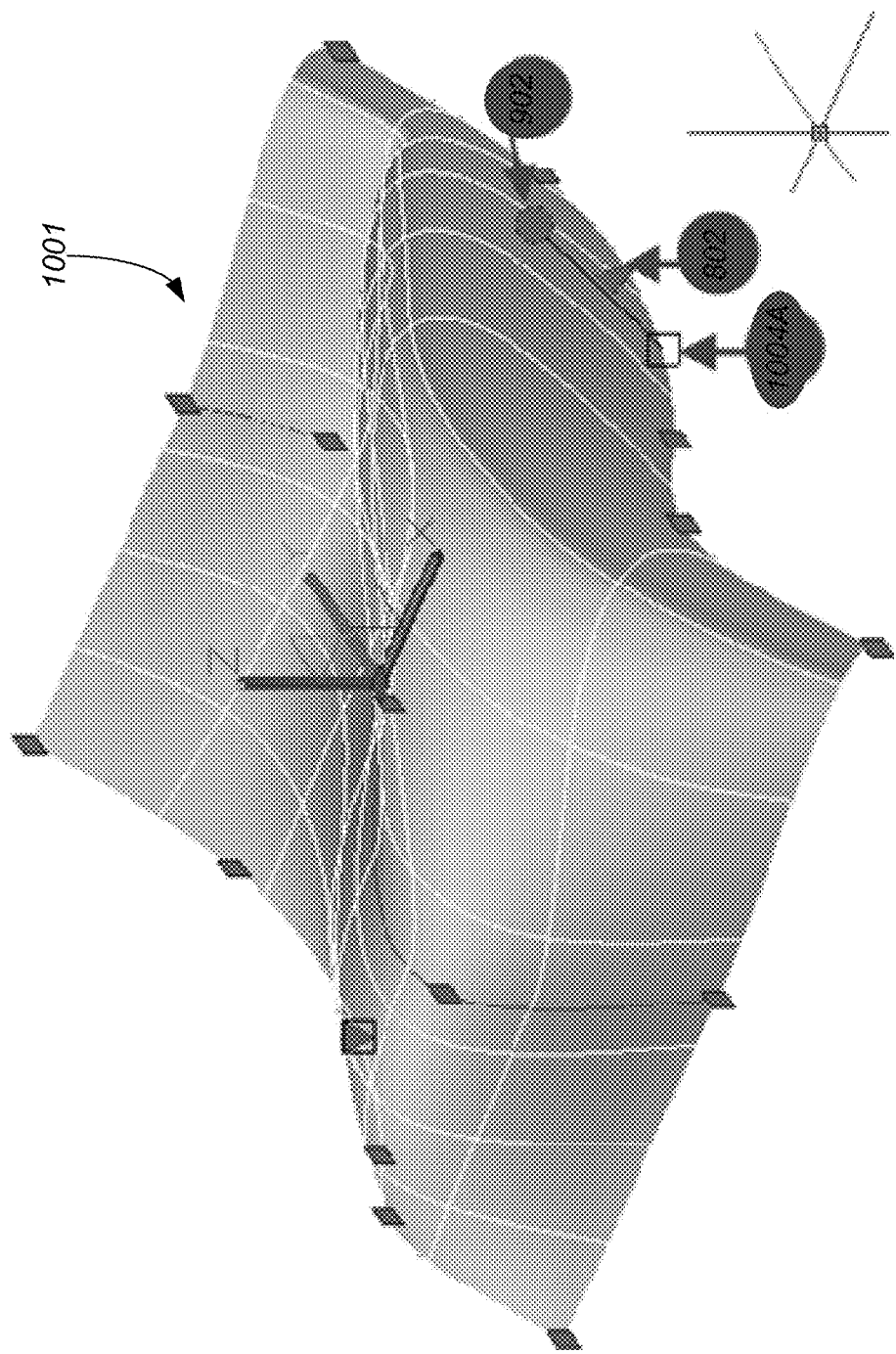
FIG. 11 illustrates the resulting display when a user selects an expander grip 1004A in accordance with one or more embodiments of the invention.

FIG. 11 illustrates the resulting display when a user selects/clicks on an expander grip 1004A of a selected surface in accordance with one or more embodiments of the invention. In this case, the user has the loft surface 1001 selected and selects/clicks on the expander grip 1004A on the right of the surface. Such a selection exposes the draft angle grip 802 and the bulge magnitude grip 902. If the user selects the draft angle grip 802 and starts moving it, similar to that illustrated in FIG. 8, the movement is constrained to a radial plane and the surface updates based on the new angle value (that is represented graphically via the visual cue 804 of FIG. 8).

Figure 12A:
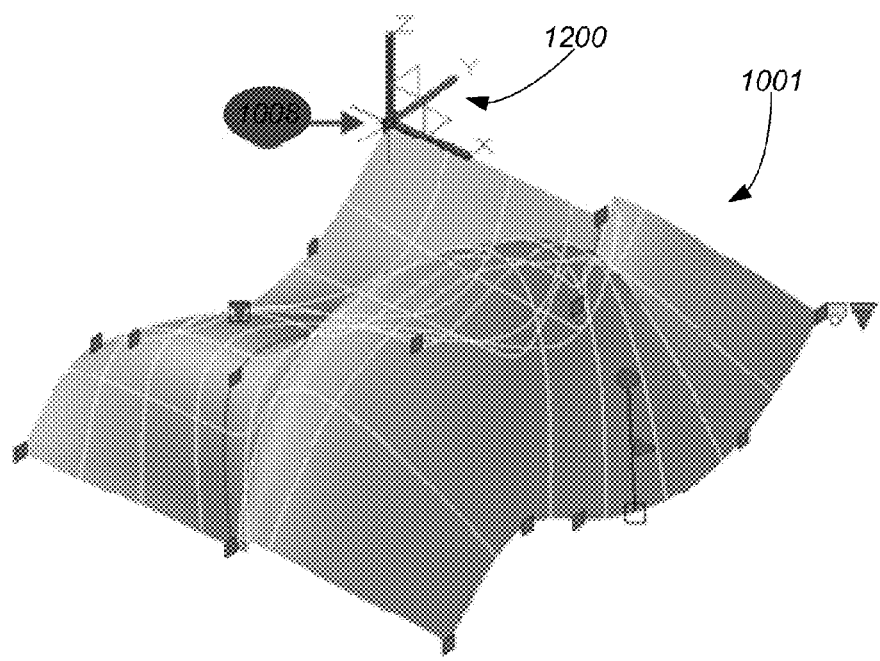
FIGS. 12A and 12B illustrate the user hovering on a profile grip 1008 of FIG. 10 and the resulting relocation and use of the gizmo at the location of the hovered point in accordance with one or more embodiments of the invention.
Figure 12B:
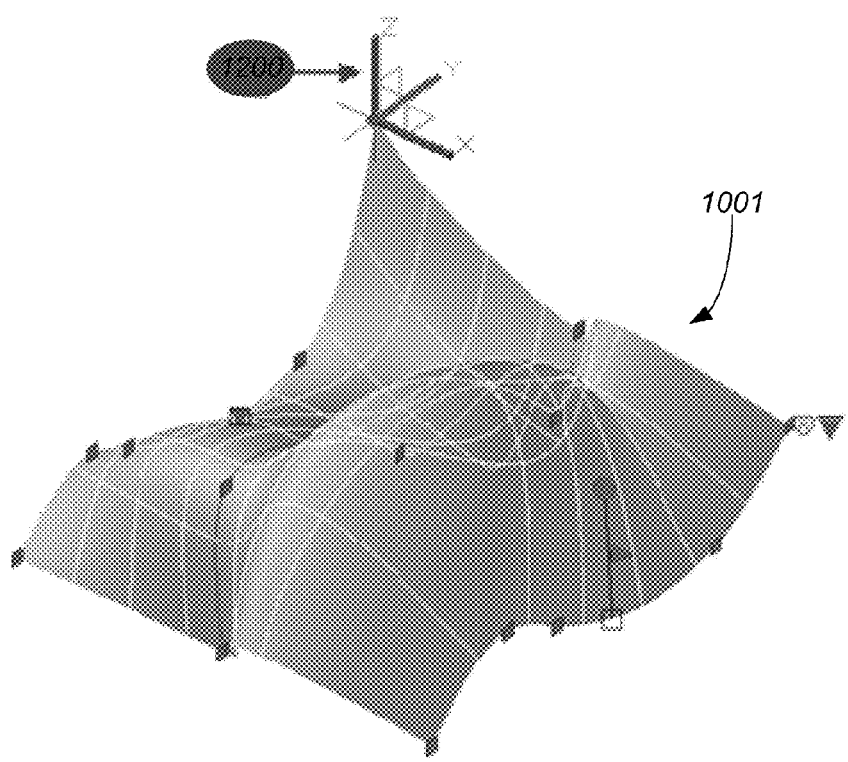

FIGS. 12A and 12B illustrate the user hovering on a profile grip 1008 of FIG. 10 and the resulting relocation and use of the gizmo at the location of the hovered point in accordance with one or more embodiments of the invention. In FIG. 12A, the user has the loft surface 1001 selected, and hovers on the profile grip 1008. The active gizmo 1200 is relocated to this grips position. The user then interacts with the gizmo 1200 and the surface 1001 is updated based on the position of the profile.

Loft Creation Using Edges from Existing Surfaces

Figure 13:
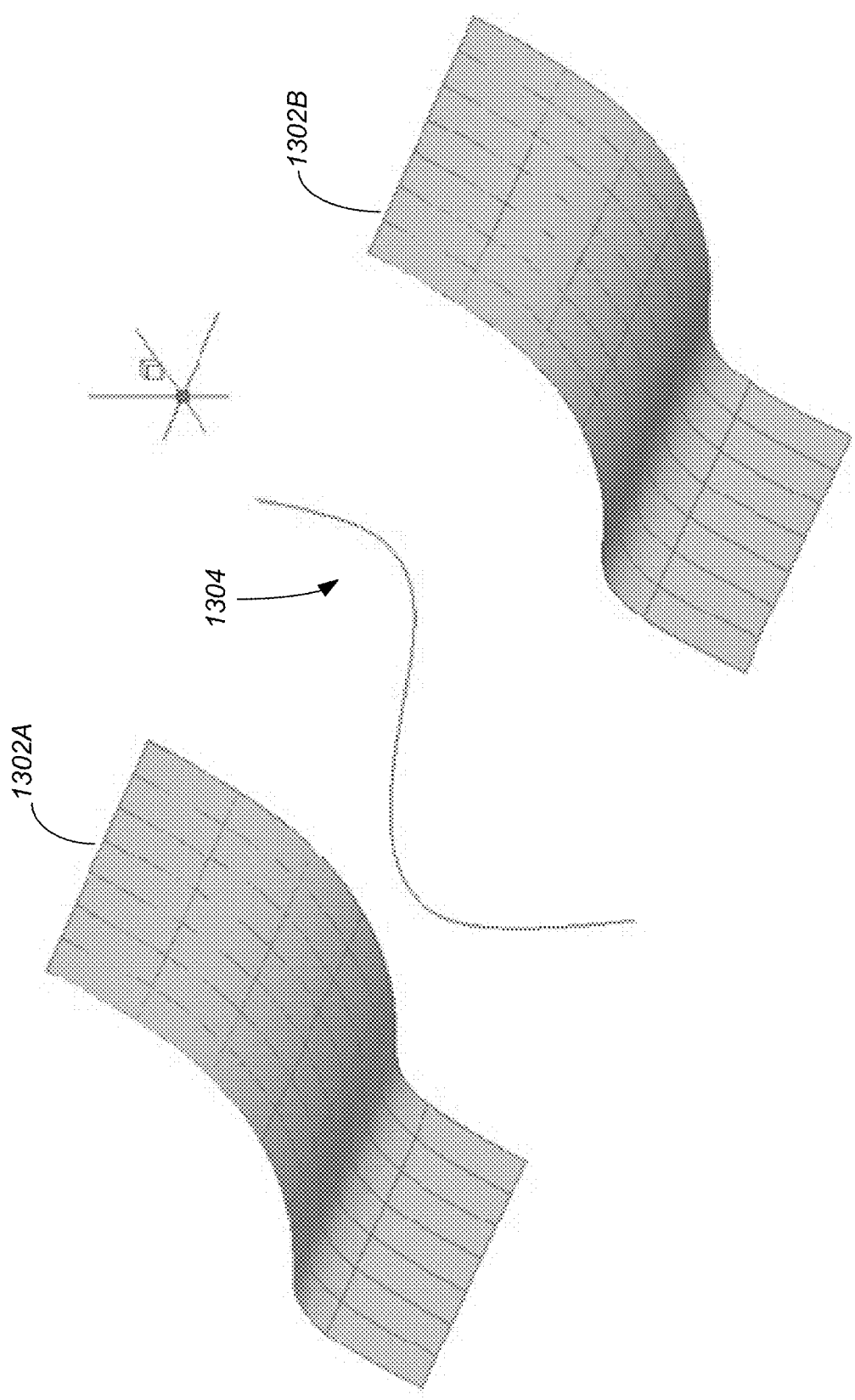
FIG. 13 illustrates two surfaces and one intermediate spline that can be used to create a loft when associativity is either set to "off" or "on" in accordance with one or more embodiments of the invention.

Another example that may be used to illustrate the graphical affordances is that of loft creation using edges from existing surfaces. FIG. 13 illustrates two surfaces 1302A and 1302B and one intermediate spline 1304 that can be used to create a loft when associativity is either set to "off" or "on" (surface associativity has no impact on the visual cues and graphical language during creation) in accordance with one or more embodiments of the invention.

Figure 14:
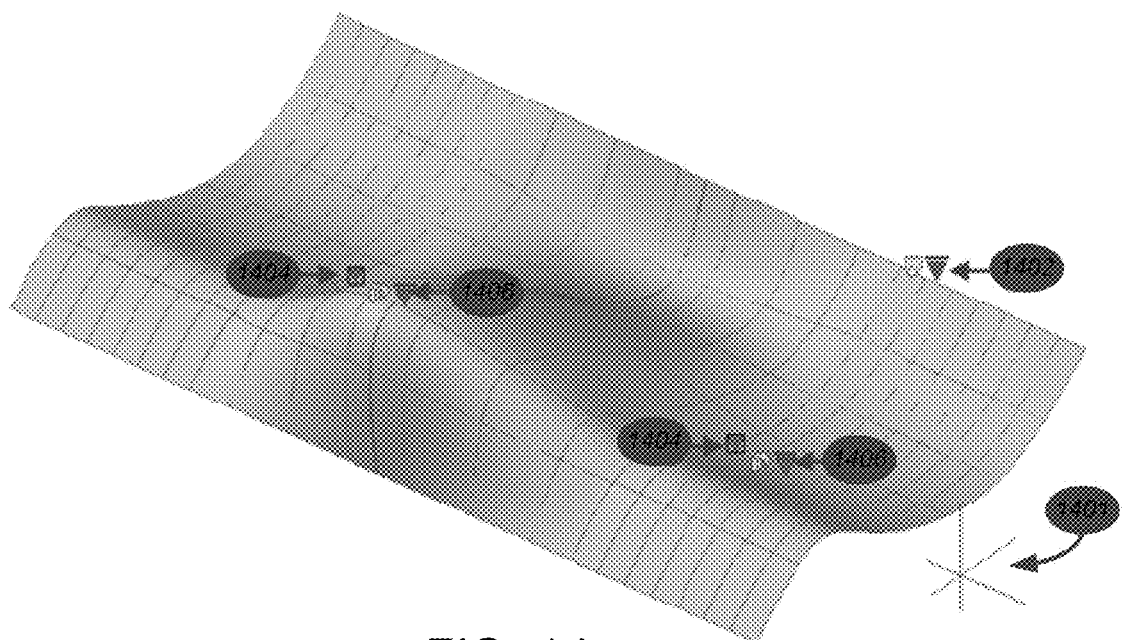
FIG. 14 illustrates the multiple visual cues that may be presented and available to the user during the loft creation process in accordance with one or more embodiments of the invention.

FIG. 14 illustrates the multiple visual cues that may be presented and available to the user during the loft creation process in accordance with one or more embodiments of the invention. The crosshair 1401 represents the mouse cursor and the directed command has been hidden by the user. Additional visual cues 1402, 1404, and 1406 are provided that can inject modifications in the creation process without interfering with the directed command flow.

A global loft option is available via grip 1402 (e.g., see above). Two expander grips 1404 are also displayed to indicate that the edge condition can be modified; these expanders are there to limits the visual clutter and hide/expose additional visual cues.

Because the loft was created using surfaces 1302A and 1302B at the end and start, the user can also set what type of continuity condition exists between the surfaces 1302A and 1302B.

Figure 15:
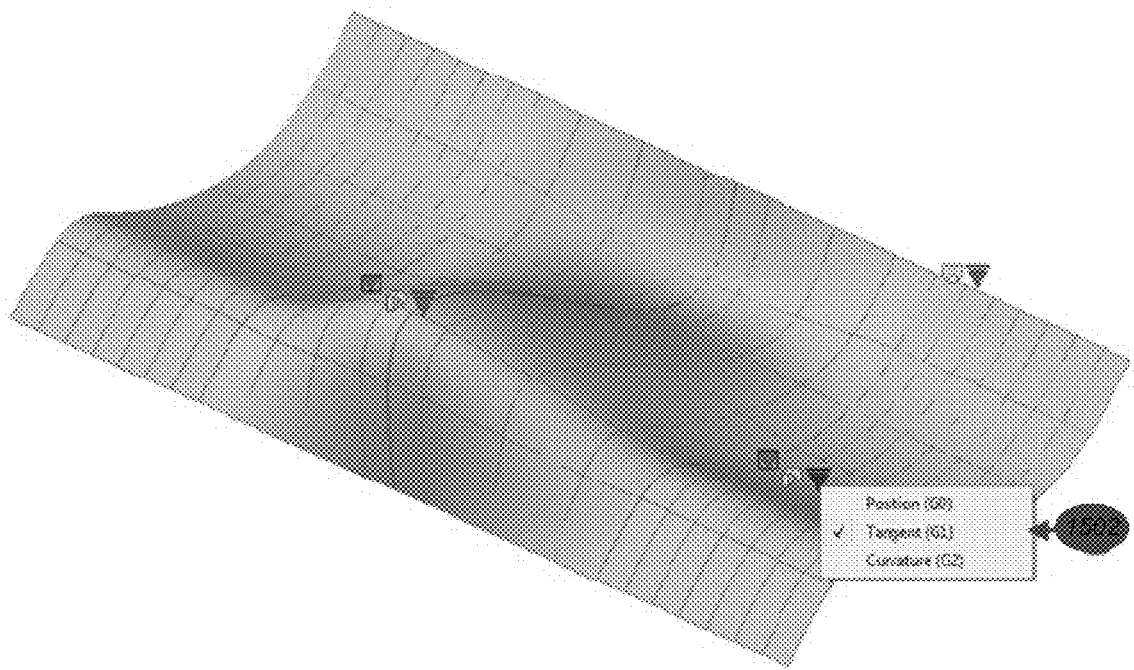
FIG. 15 illustrates the expansion of the loft surface continuity creation options in accordance with one or more embodiments of the invention.

FIG. 15 illustrates the expansion of the loft surface continuity creation options in accordance with one or more embodiments of the invention. In FIG. 15, the user is still in the command creation loop and clicks on the continuity grip 1406. This exposes a menu 1502 in which the user can select what type of continuity will be used when the surface is being generated (e.g., position [G0], tangent [G1], or curvature [G2]). Once the user clicks any of the menu items, the system returns the user to the command creation loop.

Figure 16:
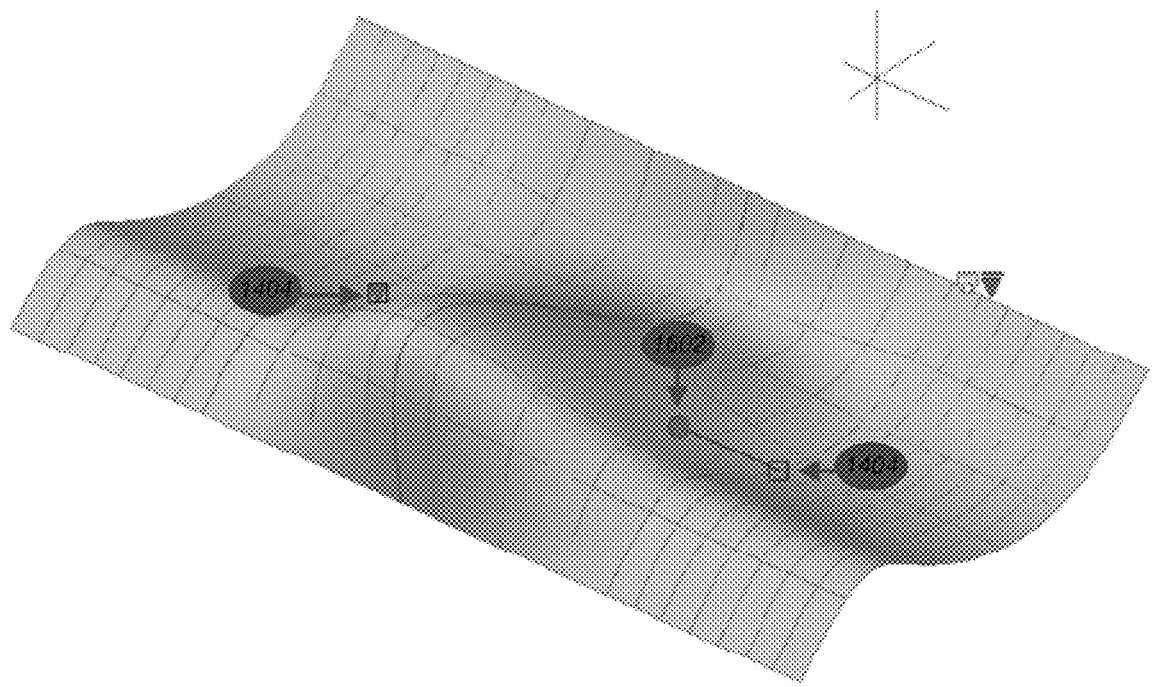
FIG. 16 illustrates the scale magnitude visual affordance that is displayed upon activation of the expander 1404 of FIG. 14 in accordance with one or more embodiments of the invention.
Figure 17:
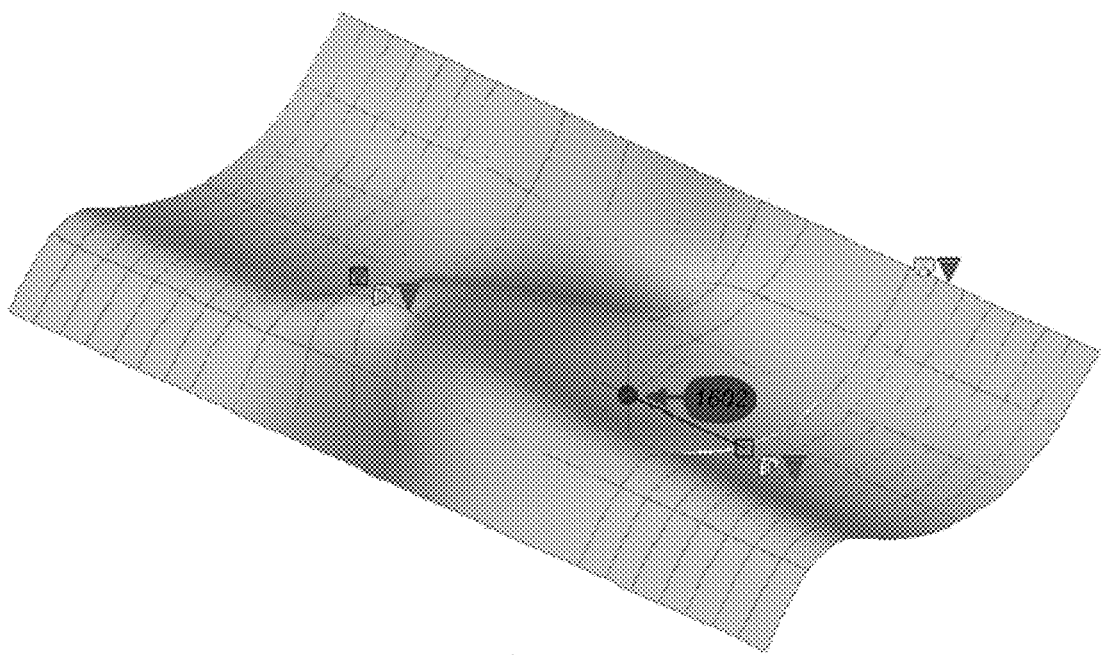
FIG. 17 illustrates the interaction with the magnitude scale grip 1602 in accordance with one or more embodiments of the invention.

FIG. 16 illustrates the scale magnitude visual affordance that is displayed upon activation of the expander 1404 of FIG. 14 in accordance with one or more embodiments of the invention. The user is still in the command creation loop and has selected/clicked on the expander grip 1404 on the right of the surface. In response, the scale magnitude grip 1602 is displayed. FIG. 17 illustrates the interaction with the magnitude scale grip 1602 in accordance with one or more embodiments of the invention. The user is still in the command creation loop and clicks on the scale magnitude grip 1602 and starts moving it. The movement is constrained to a vector. The surface also updates (e.g., dynamically) based on the new scale value. Once the user clicks to establish the scale magnitude, the system returns the user to the command creation loop.

Loft Editing Interaction (Created from Existing Surfaces)

Figure 18:
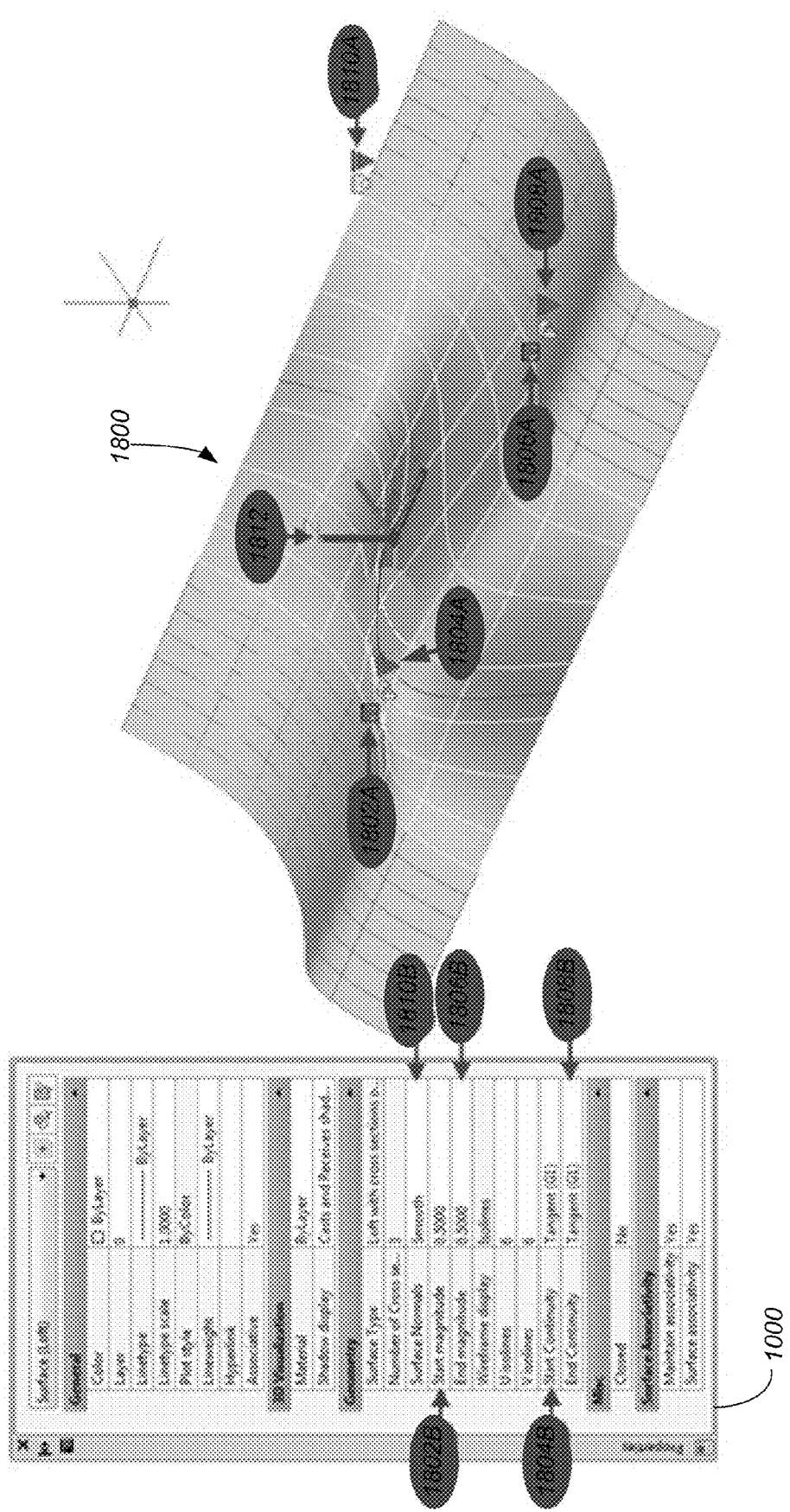
FIG. 18 illustrates an object property manager, lofted surface, and visual affordances used to edit a loft created from existing surfaces in accordance with one or more embodiments of the invention.

FIG. 18 illustrates an object property manager, lofted surface, and visual affordances used to edit a loft created from existing surfaces in accordance with one or more embodiments of the invention. Once the loft surface is created, its properties can be edited either via the object property manager 1000 or on the surface 1800 using the expandable graphical affordances. Properties that are less utilized/modified have been hidden under the expander grips 1802A and 1806A to reduce the visual cluttering on the object 1800 itself.

The "Start Magnitude" property 1802B from the object property manager 1000 is represented by grip 1802A on the surface 1800. The "Start Continuity" property 1804B from the object property manager 1000 is represented by grip 1804A on the surface 1800. The "End Magnitude" property 1806B from the object property manager 1000 is represented by grip 1806A on the surface 1800. The "End Continuity" property 1808B from the object property manager 1000 is represented by grip 1808A on the surface 1800. The "Surface Normal" property 1810B from the object property manager is represented by grip 1810A on the surface 1800. The center of the surface 1812 is a prime location and is reserved for the high traffic interactions possible with the Move/Rotate/Scale Gizmo affordances.

In view of the above, it can be seen that all visual cues have been reused from the creation process during the editing process and the user can easily transfer knowledge of the visual cues to the editing process.

In-Canvas Manipulators for Each Surface Type

The table below is a list of all the surface types and affordances that compose the natural surface mode environment in accordance with one or more embodiments of the invention. The first column indicates the surface type, the second column provides the visual affordances for surface type when surface associativity is "off" The third column provides the visual affordances for the surface type when the surface associativity is "on."

| Surface Type | SURFACE ASSOCIATIVITY = OFF | SURFACE ASSOCIATIVITY = ON |
| --- | --- | --- |
| Surface (NURBS) | N/A | N/A |
| Surface (extrusion) | Height grip<br>Taper grip<br>Related profile grips | Height grip - can be disabled if the height is controlled via a parametric equation<br>Taper grip - can be disabled if the height is controlled via a parametric equation<br>Related disable profile grips |
| Surface (Loft) | Related profile grips<br>Loft grips menu option<br>Expander grip for the magnitude handle if the property exists<br>Continuity grips if connected with adjacent surfaces | Related disable profile grips<br>Loft grips menu option<br>Expander grip for the magnitude handle if the property exists. if the magnitude is controlled via an equation, then the expander grips are disabled (only the border is drawn)<br>Continuity grips - if connected with adjacent surface |
| Surface (Planar) | Related profile grips | Related disable profile grips |
| Surface (Revolve) | Related profile grips<br>Axis position grip<br>revolve grip (triangle) | Related disable profile grips<br>Disable Axis grip<br>revolve grip - if the revolution angle is controlled via an equation, then the grip is disabled (only the border is drawn) |
| Surface (sweep) | Related profile grips<br>Related grips for the sweep profile | Related disable profile grips<br>Related disable grips for the sweep profile |
| Surface (Blend) | Continuity grips - if connected with adjacent surface | Continuity grips - if connected with adjacent surface |
| Surface (network) | Related profile grips<br>Continuity grips - if connected with adjacent surface | Related disable profile grips<br>Continuity grips - if connected with adjacent surface |
| Surface (Fillet) | Expander grip for the Fillet handle | Expander grip for the fillet handle. if the radius is controlled via an equation then the expander grip is disabled (only the border is drawn) |
| Surface (Extend) | Extend grip (triangle) center of extended edge | Extend grip, can be disabled if the extension is controlled via a parametric equation |

-continued

| Surface Type | SURFACE ASSOCIATIVITY = OFF | SURFACE ASSOCIATIVITY = ON |
| --- | --- | --- |
| Surface (Offset) | Offset Grip (triangle) in center of surface and pointing in the positive direction. the surface is only updated once the distance is acquired | Offset grip -- can be disabled is the offset is controlled via a parametric equation |
| Surface (Patch) | Related profile grips if the patch in not created from a surface edge sub-object Expander grip for the magnitude handle if the property exists Continuity grips -- if connected with adjacent surface | Related disable profile grips -- if the patch is not created from a surface edge sub-object Expander grip - for the magnitude handle (if the property exists). If the magnitude is controlled via an equation, then the expander grip is disabled (only the border is drawn) Continuity grips -- if connected with adjacent surface |

Logical Flow

Figure 19:
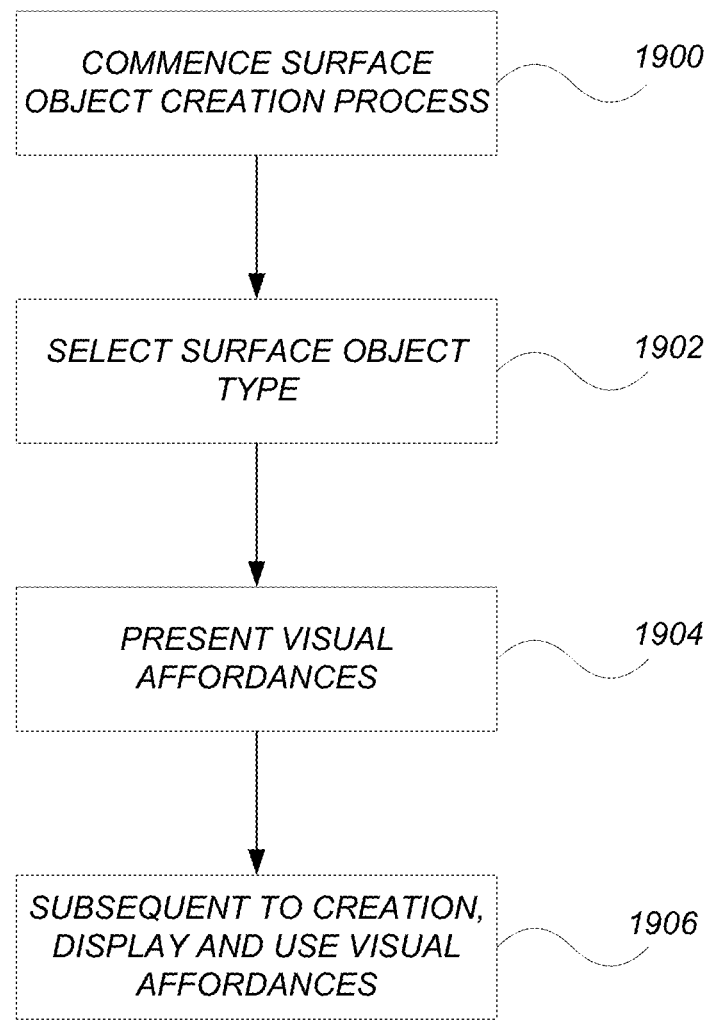
FIG. 19 is a flow chart illustrating the logical flow for creating and editing a surface object in a computer implemented surface modeler in accordance with one or more embodiments of the invention.

FIG. 19 is a flow chart illustrating the logical flow for creating and editing a surface object in a computer implemented surface modeler in accordance with one or more embodiments of the invention.

At step 1900, a surface object creation process is commenced in a surface modeler. At step 1902, as part of the surface object creation process, a surface object type is selected. For example, the user may select an icon in a tool bar for one of twelve (12) different surface types (see FIG. 3).

At step 1904, during the surface object creation process, one or more visual affordances are presented. Such visual affordances are grips that can be used to inject modification into the surface object creation process. In other words, the grips can be used to accept external input to inject modification into the creation process without interfering with a directed command flow of the surface object creation process. In this regard, a flow or sequence of operations for creating the surface object may be presented on the screen and the user may use the grips to edit and modify the surface without affecting this sequence of operation/directed command flow.

The visual affordances may be presented in accordance with a hierarchical system: center of bounding box; center of defining edge of object; and upper corner of bounding of surface object.

The center (also referred to as "first center") of a bounding box of the surface object (selection specific) may be used to present a move, rotate, and/or scale visual affordance.

A center (referred to as "second center") of a defining edge of the surface object (object specific) may be used to present a continuity, draft angle, and/or bulge magnitude visual affordance. For example, an expander grip may indicate an edge condition of the surface object that can be modified. Such an expander grip limits visual clutter and is used to hide/expose (via selection of the expander grip) one or more additional visual affordances that can be used to modify the edge condition (e.g., the continuity, draft angle, and/or bulge magnitude visual affordance).

In addition, an upper corner of a bounding of the surface object (object specific) may be used to present object specific visual affordances. Such a general option may include the ability to select a specific type of surface object (e.g., if the object is a loft, the general option may allow selection of the type of loft such as ruled, smooth fit, normal to all sections, etc.).

It may also be noted that the same visual affordances may be displayed/presented regardless of whether the surface object being created has surface associativity on or off.

At step 1906, subsequent to the creation of the surface object, the same visual affordances are displayed and used to edit the surface object. Such a step may also include the display of an object property manager that displays properties of the surface object that can be edited using corresponding visual affordances displayed directly on the surface object.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

Unique aspects of embodiments of the invention may include one or more of the following:

1. A common visual affordance system shared between creation and editing user interactions;
2. A common visual affordance system shared between associative and non-associative surface types;
3. A hierarchical positioning (onto objects) of a system of visual affordances which corresponds to the user edit/creation patterns;
4. An "Expander" grips that hide some of the visual affordances to un-clutter the graphical representation;
5. A directed command flow that accepts external input while resuming the directed flow without obstruction; and
6. A taxonomy of visual cues shared between eleven (11) surface types.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for editing a surface object in a computer implemented surface modeler, comprising:
    (a) commencing, in the computer-implemented surface modeler, a surface object creation process;
    (b) selecting a surface object type;
    (c) presenting, during the surface object creation process, one or more visual affordances, wherein the one or more visual affordances comprise one or more grips that can be used to inject modification into the surface object creation process;
    (d) maintaining an associative knowledge base that determines an associative behavior of the surface object; and
    (e) subsequent to creation of the surface object:
        (i) displaying the one or more visual affordances; and
        (ii) using the one or more visual affordances to edit the surface object; and
    wherein:
        the same one or more visual affordances are displayed regardless of whether the surface object is associative and depends on a property of another object/surface, or is non-associative and has no relation to another object/surface;

one of the one or more grips comprises an expander grip;
the expander grip indicates an edge condition of the surface object that can be modified;
the expander grip limits visual clutter and is used to hide/expose one or more additional visual affordances; and
the one or more additional visual affordances are used to modify the edge condition.

2. The method of claim 1, wherein:
(a) the one or more visual affordances are presented in accordance with a hierarchical system;
(b) the hierarchical system comprises:
(i) a first center of a bounding box of the surface object for presenting a move visual affordance, a rotate visual affordance, and a scale visual affordance;
(ii) a second center of a defining edge of the surface object for presenting a continuity visual affordance and a bulge magnitude visual affordance; and
(iii) an upper corner of a bounding of the surface object for presenting an object specific visual affordance.

3. The method of claim 1, wherein the one or more grips are used to accept external input to inject modification into the creation process without interfering with a directed command flow of the surface object creation process.

4. The method of claim 1, wherein:
in response to selecting the expander grip, a draft angle visual affordance and bulge magnitude visual affordance are displayed.

5. The method of claim 1, wherein one of the one or more grips comprises a general option grip to select a property specific type of surface object.

6. The method of claim 1, further comprising subsequent to the creation of the surface object, displaying an object property manager, wherein:
the object property manager displays one or more properties of the surface object that can be edited; and
the one or more properties correspond to and can be modified by the one or more visual affordances.

7. An apparatus for editing surface objects in a computer system comprising:
(a) a computer having a memory;
(b) an surface modeler application executing on the computer, wherein the surface modeler application is configured to:
(i) commence a surface object creation process;
(ii) select a surface object type;
(iii) present, during the surface object creation process, one or more visual affordances, wherein the one or more visual affordances comprise one or more grips that can be used to inject modification into the surface object creation process;
(iv) maintain an associative knowledge base that determines an associative behavior of the surface object and
(v) subsequent to creation of the surface object:
(i) display the one or more visual affordances; and
(ii) use the one or more visual affordances to edit the surface object; and
wherein:
the same one or more visual affordances are displayed regardless of whether the surface object is associative and depends on a property of another object/surface, or is non-associative and has no relation to another object/surface;
one of the one or more grips comprises an expander grip;
the expander grip indicates an edge condition of the surface object that can be modified;
the expander grip limits visual clutter and is used to hide/expose one or more additional visual affordances; and
the one or more additional visual affordances are used to modify the edge condition.

8. The apparatus of claim 7, wherein:
(a) the one or more visual affordances are presented in accordance with a hierarchical system; and
(b) the hierarchical system comprises:
(i) a first center of a bounding box of the surface object for presenting a move visual affordance, a rotate visual affordance, and a scale visual affordance;
(ii) a second center of a defining edge of the surface object for presenting a continuity visual affordance and a bulge magnitude visual affordance; and
(iii) an upper corner of a bounding of the surface object for presenting an object specific visual affordance.

9. The apparatus of claim 7, wherein the one or more grips are used to accept external input to inject modification into the creation process without interfering with a directed command flow of the surface object creation process.

10. The apparatus of claim 7, wherein:
in response to selecting the expander grip, a draft angle visual affordance and bulge magnitude visual affordance are displayed.

11. The apparatus of claim 7, wherein one of the one or more grips comprises a general option grip to select a property specific type of surface object.

12. The apparatus of claim 7, wherein the application is further configured to subsequent to the creation of the surface object, display an object property manager, wherein:
the object property manager displays one or more properties of the surface object that can be edited; and
the one or more properties correspond to, and can be modified by, the one or more visual affordances.

13. A computer readable non-transient storage medium encoded with computer program instructions which when accessed by a computer cause the computer to load the program instructions to a memory therein creating a special purpose data structure causing the computer to operate as a specially programmed surface modeling computer, executing a method of editing surface objects, comprising:
(a) commencing, in the specially programmed surface modeling computer, a surface object creation process;
(b) selecting, in the specially programmed surface modeling computer, a surface object type;
(c) presenting, in the specially programmed surface modeling computer, during the surface object creation process, one or more visual affordances, wherein the one or more visual affordances comprise one or more grips that can be used to inject modification into the surface object creation process;
(d) maintaining an associative knowledge base that determines an associative behavior of the surface object; and
(e) subsequent to creation of the surface object:
(i) displaying, in the specially programmed surface modeling computer, the one or more visual affordances; and
(ii) using, in the specially programmed surface modeling computer, the one or more visual affordances to edit the surface object; and
wherein:
the same one or more visual affordances are displayed regardless of whether the surface object is associative and depends on a property of another object/surface, or is non-associative and has no relation to another object/surface;
one of the one or more grips comprises an expander grip;
the expander grip indicates an edge condition of the surface object that can be modified;

the expander grip limits visual clutter and is used to hide/expose one or more additional visual affordances; and the one or more additional visual affordances are used to modify the edge condition.

14. The computer readable non-transient storage medium of claim 13, wherein:
   (a) the one or more visual affordances are presented in accordance with a hierarchical system; and
   (b) the hierarchical system comprises:
      (i) a first center of a bounding box of the surface object for presenting a move visual affordance, a rotate visual affordance, and a scale visual affordance;
      (ii) a second center of a defining edge of the surface object for presenting a continuity visual affordance and a bulge magnitude visual affordance; and
      (iii) an upper corner of a bounding of the surface object for presenting an object specific visual affordance.

15. The computer readable non-transient storage medium of claim 13, wherein the one or more grips are used to accept external input to inject modification into the creation process without interfering with a directed command flow of the surface object creation process.

16. The computer readable non-transient storage medium of claim 13, wherein:
   in response to selecting the expander grip, a draft angle visual affordance and bulge magnitude visual affordance are displayed.

17. The computer readable non-transient storage medium of claim 13, wherein one of the one or more grips comprises a general option grip to select a property specific type of surface object.

18. The computer readable non-transient storage medium of claim 13, further comprising subsequent to the creation of the surface object, displaying, in the specially programmed surface modeling computer, an object property manager, wherein:
   the object property manager displays one or more properties of the surface object that can be edited; and
   the one or more properties correspond to and can be modified by the one or more visual affordances.

* * * * *